United States Patent [19]
Hartman et al.

[11] Patent Number: 5,821,935
[45] Date of Patent: Oct. 13, 1998

[54] GRAPHICAL USER INTERFACE WITH ELECTRONIC FEATURE ACCESS

[75] Inventors: Hollister A. Hartman, Northville; Jerome Go Ng, Ann Arbor, both of Mich.

[73] Assignee: United Technologies, Automotive, Inc., Dearborn, Mich.

[21] Appl. No.: 707,155

[22] Filed: Sep. 3, 1996

[51] Int. Cl.[6] .............................. B60L 1/00; B60Q 1/00; G06F 15/00

[52] U.S. Cl. .................... 345/349; 307/10.1; 340/438; 340/461; 345/349; 345/352; 345/970; 701/36

[58] Field of Search ...................... 345/339, 340, 345/342, 343, 348, 352, 353, 354, 326, 349, 350, 351; 340/438, 439, 458, 459, 461, 990, 995; 307/10.1; 701/1–18, 200, 20, 21, 22, 23, 24, 49, 53, 70, 93, 36; 364/132; 341/20, 21, 22, 23

[56] References Cited

U.S. PATENT DOCUMENTS

| | | | |
|---|---|---|---|
| 4,792,783 | 12/1988 | Burgess et al. | 340/461 |
| 5,270,689 | 12/1993 | Hermann | 345/145 |
| 5,539,429 | 7/1996 | Yano et al. | 345/173 |
| 5,666,102 | 9/1997 | Lahiff | 340/461 |

FOREIGN PATENT DOCUMENTS

| | | |
|---|---|---|
| 43 38 17 1 C1 | 4/1995 | Germany . |
| 29 60 47 17 U1 | 7/1996 | Germany . |

OTHER PUBLICATIONS

Yamaha PSR–520 Owner's Manual, Yamaha Corp., 1995 pp. 4–5, 10–14, 33–34.

*Primary Examiner*—Ba Huynh
*Attorney, Agent, or Firm*—Howard & Howard

[57] ABSTRACT

A graphical user interface system for use in a vehicle includes a series of selection switches and multi-purpose adjustment switches. The selection switches enable a user to choose a vehicle subsystem and a display screen instantaneously displays the subsystem and all adjustable functions associated with that system. The adjustment switches are utilized to adjust the functions of the subsystem to change the operation. The arrangement and selection of the adjustment switches and the display strategy enable a user to readily adjust all of the functions of a particular subsystem without having to page through various menu screens.

19 Claims, 5 Drawing Sheets

GRAPHICAL USER INTERFACE WITH ELECTRONIC FEATURE ACCESS

BACKGROUND OF THE INVENTION

This invention relates to a graphical user interface for use inside of vehicles. More particularly, this invention relates to a graphical user interface that provides a user visual access to a variety of features associated with a subsystem of a vehicle without requiring the user to page through a series of menus to access those functions.

A variety of graphical user interfaces have been developed for facilitating a user's access and control of electronic products and systems. More recently, attempts have been made to integrate graphical user interfaces into vehicles. Incorporating a graphical user interface into a vehicle presents special problems. For example, a computer operator within an office environment typically has the luxury of being able to page through a series of menus to access a desired application. The same is not true, however, for a driver within a vehicle. A driver of a vehicle must be able to devote as much attention as possible to the road and driving conditions to avoid traffic accidents. If a driver were required to page through a series of menus to access various electronic functions and subsystems within the vehicle, the potential for a traffic accident is increased. Therefore, there is a need for a graphical user interface, which is adapted to be used in a vehicle, that provides ready access to a variety of adjustable features associated with an electronically controllable subsystem within the vehicle without requiring the driver to page through a series of menu screens.

This invention addresses the need for a graphical user interface that is readily and easily used by a driver of a vehicle. The arrangement of controls and screen displays associated with this invention provide a driver or user of the system with convenient, accurate and simple access to a variety of adjustable functions associated with various subsystems on the vehicle.

SUMMARY OF THE INVENTION

In general terms, this invention is a system for controlling a plurality of subsystems within a vehicle. The system includes a plurality of selection switches that are manipulable to select one of the plurality of subsystems to be controlled. A display screen is adapted to display the selected functions and a plurality of adjustable functions associated with the selected subsystem. An multi-purpose adjustment switch manipulable to select from among the displayed plurality of adjustable functions. The multi-purpose adjustment switch is also to manipulable to make adjustments to a selected function of the subsystem. An control switch is also included that is associated with a particular one of the displayed plurality of adjustable functions. The control switch is manipulable to make adjustments to that particular function. An electronic controller is coupled with the plurality of subsystems, the selection switches, the display screen, the multi-purpose adjustment switch and the control switch. The electronic controller controls the display screen for displaying the selected subsystem and adjustments made to the adjustable functions. The display shows the adjustments being made to the functions simultaneous with a user manipulating one of the switches. The electronic controller changes the operation of a selected subsystem responsive to at least one of the switches being manipulated so that the operation of each subsystem is consistent with a display of each subsystem.

The method of this invention includes several basic steps. In general terms, the method of controlling a plurality of subsystems within a vehicle that includes a display screen, a plurality of selection switches each dedicated to a respective subsystem, at least one multi-purpose adjustment switch for controlling a plurality of functions associated with the subsystems, and an electronic controller for controlling the display screen and the subsystems. The first step is to manipulate one of the selection switches to select the subsystem that is associated with that selection switches. The electronic controller responsively causes the selected subsystem and a plurality of functions associated with that subsystem to be displayed on the display screen. The multi-purpose adjustment is then used to select one of the displayed functions. The multi-purpose adjustment switch is next manipulated to adjust the selected function. The electronic controller causes the display screen to simultaneously display an adjustment made to the selected function when the multi-purpose adjustment switch is manipulated to adjust that function. The electronic controller responsively adjusts the selected subsystem so that its performance is consistent with what is indicated on the visual display.

In one embodiment of this invention, the display screen is mounted on a rotatable steering wheel within the vehicle. In this embodiment, the method of this invention includes determining a desired orientation of a display on the display screen so that the display is in an upright position relative to the driver. A steering wheel home position is determined, which corresponds to the desired orientation of the display being aligned with the display screen. A rotated position of the steering wheel with respect to the steering wheel home position is determined and the display on the display screen is counter-rotated in an amount corresponding to the rotated position of the steering wheel to maintain the display in the desired orientation.

The various features and advantages of this invention will become apparent to those skilled in the art from the following detailed description of a preferred embodiment. The drawings that accompany the detailed description can be described as follows.

DETAILED DESCRIPTION OF THE PREFERRED EMBODIMENT

Figure 1:
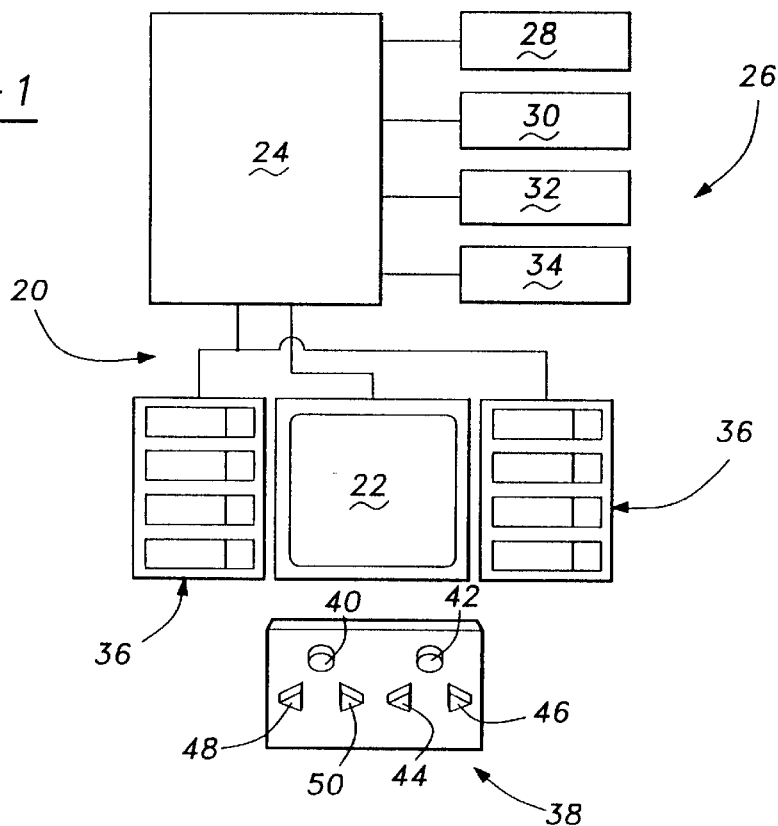
FIG. 1 is a schematic illustration of a graphical user interface system designed according to this invention.

FIG. 1 illustrates a graphical user interface system 20 that is designed to be placed within a vehicle. A display screen 22 displays a variety of information for a driver and/or passenger of a vehicle. An electronic controller 24 controls what is shown on the display screen 22. The electronic controller 24 is coupled to a plurality of vehicle subsystems 26. Examples of subsystems include a radio 28, a cruise control 30, the heating, ventilation and air conditioning (HVAC) system 32 and a cellular telephone 34. The various subsystems of the vehicle are schematically illustrated in block diagram form because the subsystems themselves are conventional.

A plurality of selection switches 36 enable a user to select one of the subsystems to be adjusted. A set of switches 38 enable a user of the system to modify the operation of a selected subsystem. In the preferred embodiment, two multi-purpose adjustment switches 40 and 42 are included. The knobs 40 and 42 preferably are push-turn adjustment switches that can be pressed or rotated. The preferred embodiment also includes a plurality of control switches. In the illustrated embodiment, control switches 44 and 46 are grouped as one set while control switches 48 and 50 are grouped as a second set. The grouping of the control switches provides a convenient way of having bi-directional control of a function.

It is desirable to reduce the number of switches associated with a graphical user interface system. With previous attempts, however, reducing the number of switches resulted in causing a user to page through a series of menu screens to locate and make adjustments to various functions. The system 20, designed according to this invention, uses a reduced number of switches and provides the significant advantage of eliminating a driver's need to navigate through a series of menus. Further, this invention allows instant activation of the vehicle subsystems at a single press of a switch. The specific arrangement and type of multi-purpose adjustment switches 40, 42 and control switches 44, 46, 48 and 50 provides the ability to easily locate and operate the switches without distracting a driver from the task of driving the vehicle.

The selection switches 36 preferably are arrayed together alongside the display screen 22. Alternatively, the selection switches 36 can be placed on an angled, hand-contoured shelf near the display or on a collar behind the steering wheel, for example. In another embodiment, the selection switches, multi-purpose adjustment switches and control switches are supported on the steering wheel for easy access.

Each of the selection switches 36 preferably is a spring-loaded rocker switch. Each switch preferably is programmed to activate a single subsystem and, therefore, is dedicated to one subsystem within the vehicle. Having dedicated selection switches 36 provides the ability to label the switches in a manner that makes them readily perceivable by a driver. If the display screen 22 is within a "no-lean reach" of a driver, it is most preferred to place the selection switches 36 along side the display screen 22 generally as illustrated.

Figure 2:
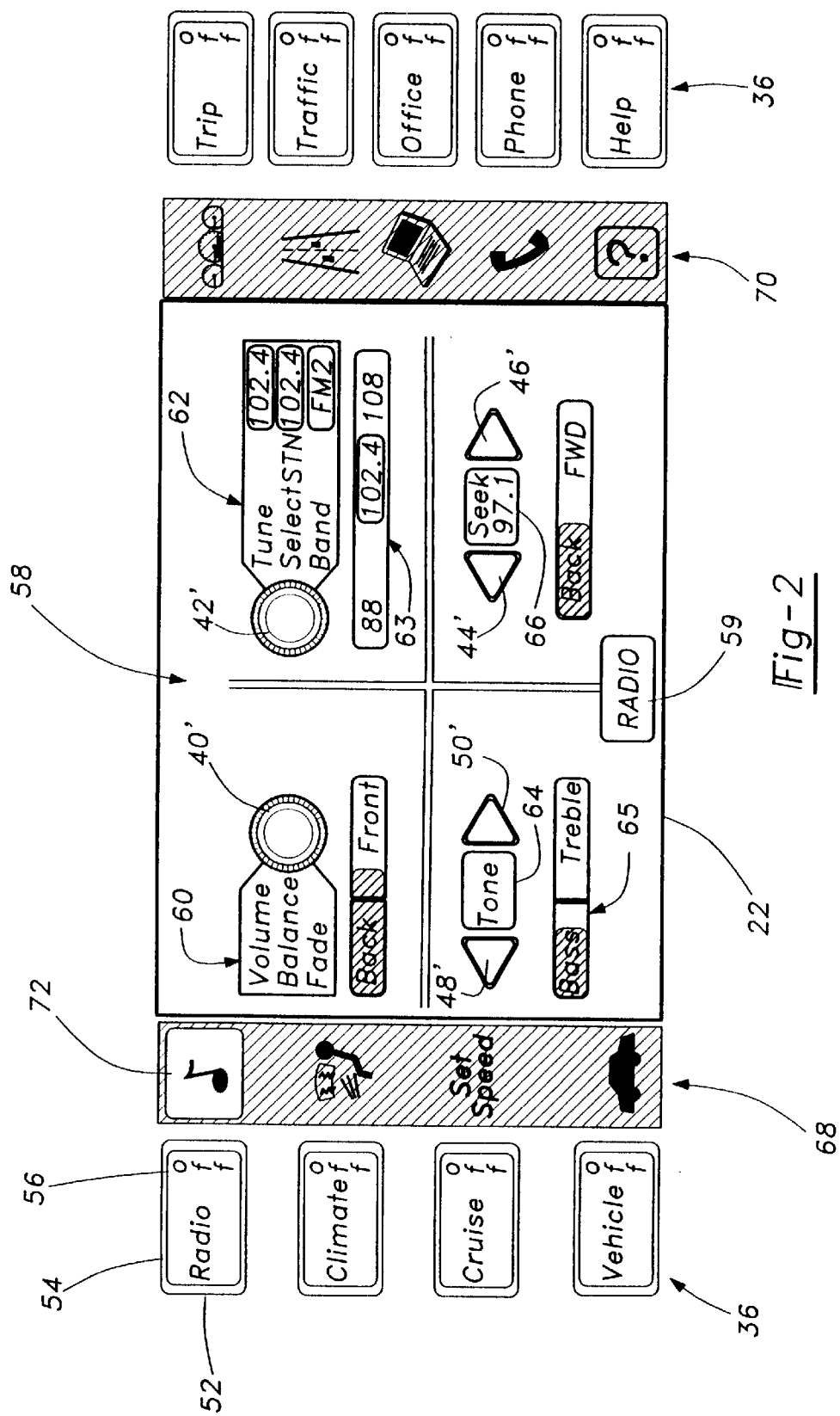
FIG. 2 is a diagrammatic illustration of a screen display associated with this invention.

Referring to FIG. 2, one of the selection switches 52, which is dedicated to the radio is labeled with the word "radio." The spring-loaded rocker switch 52 includes a labelled activation surface 54 and a deactivation surface 56 that is labeled with the word "Off." All of the selection switches 36 preferably are programmed such that an initial press of the activation surface causes the electronic controller 24 to instantaneously display the subsystem and its adjustable functions on the display screen 22 and to activate the subsystem according to preselected default settings. Subsequent presses of the activation surface of each selection switch will recall the subsystem display to the screen 22. A subsystem preferably is deactivated by the first press of the deactivation surface. "Initial" press of the activation surface refers to the first time that an activation surface is pressed after the vehicle is turned on.

FIG. 2 illustrates a preferred display 58 on the screen 22 associated with the radio subsystem. The display screen includes a subsystem identifier 59. The illustrated display is divided into four sub-screens or quadrants. Each sub-screen is associated with one of the multi-purpose adjustment switches or a set of control switches. The illustrated multi-purpose adjustment switches 40' and 42' are visual representations on the display screen 22 of the actual multi-purpose adjustment switches 40 and 42, respectively. Similarly, the control switches 44', 46', 48' and 50' are representations on the screen of the actual control switches. In the illustrated embodiment, the multi-purpose adjustment switches and control switches illustrated on the display screen are arranged in the same order as the physical layout within the vehicle. The correspondence between the physical layout and the display enables a user to readily associate movement of the switches with a desired adjustment to the functions of a displayed subsystem. Adjustments made by manipulating the switches preferably are displayed on the screen 22 simultaneously with the control knobs and buttons being manipulated by the driver.

The display 58 preferably includes the entire plurality of adjustable functions associated with the radio subsystem all on one screen. Those functions that can be adjusted by manipulating multi-purpose adjustment switch 40 are illustrated at 60. Similarly, those control functions that can be adjusted with multi-purpose adjustment switch 42 are illustrated at 62. A display portion 63 shows the driver a visual representation of an adjustment being made or the current setting for a selected function. The control switches 48 and 50 are dedicated to an adjustable function 64. The display portion 65 visually indicates to the driver the current setting of the function 64 and, simultaneously displays any adjustments made by manipulating the control switches 48 and 50. Similarly, the control switches 44 and 46 are dedicated to an adjustable function 66.

The display screen 22 preferably includes a plurality of icons 68 and 70 that correspond to the vehicle subsystems that can be operated and adjusted through the system 20. The screen icons 68 and 70 preferably appear whenever the display screen 22 is activated. An advantage provided by the screen icons is that each icon corresponds to one of the vehicle subsystems and preferably is located on the screen adjacent to the corresponding selection switch. Further, it is most preferred that the icon corresponding to a selected subsystem be highlighted or otherwise visually distinguished on the screen relative to the remaining icons. This provides the driver an additional visual indication of the selected subsystem. For example, in FIG. 2, the icon 72 is highlighted when the electronic controller 24 recognizes that the activation surface 54 of the selection switch 52 has been pressed.

Figure 3:
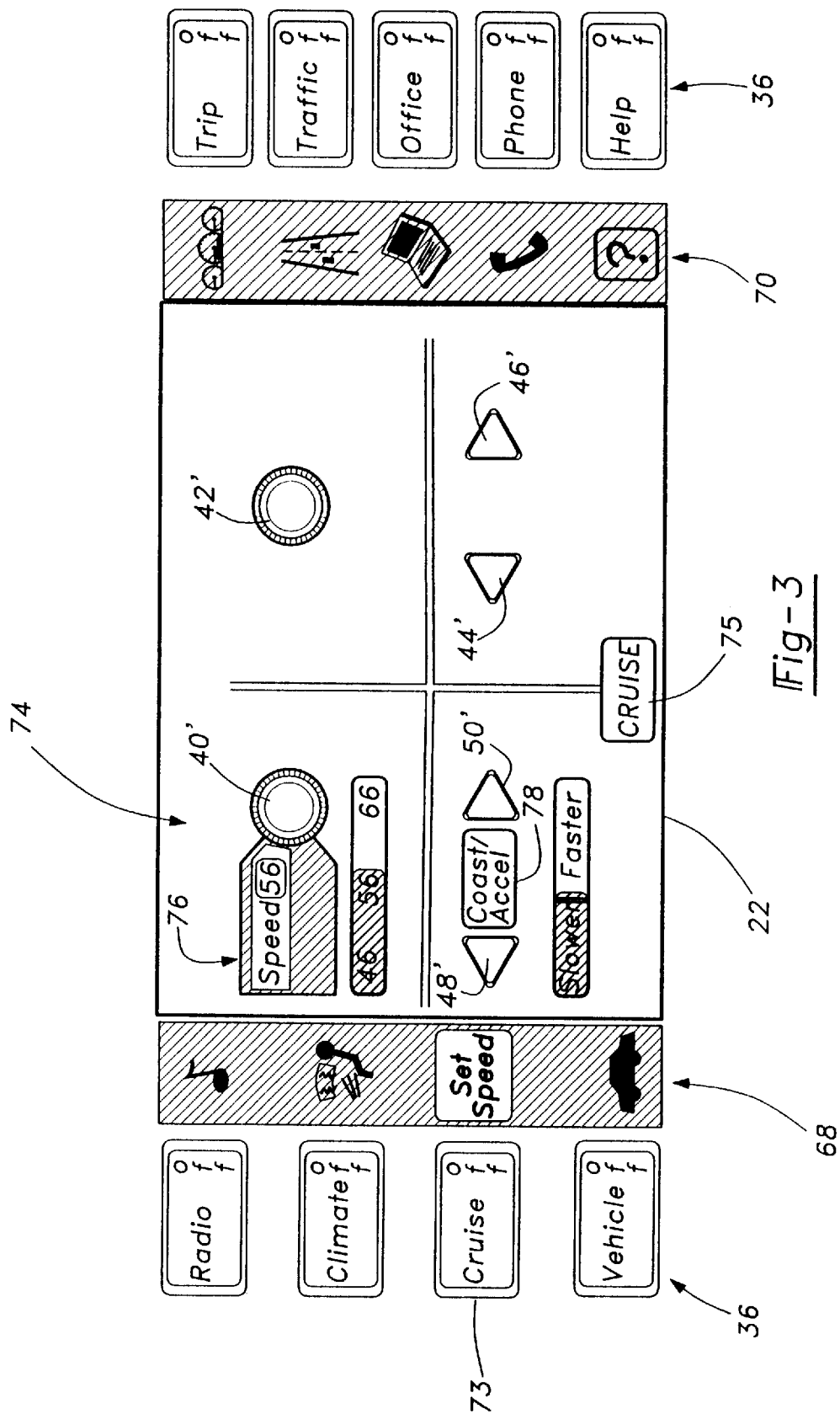
FIG. 3 is a diagrammatic illustration of a screen display associated with this invention.

Referring to FIG. 3, when the activation of the selection switch 73 is pressed, the display 74 appears on the screen 22. The display 74 includes a subsystem indicator 75, an indication of the functions 76 that are controllable by manipulating the adjustment switch 40 and an adjustable function 78 that is controllable by manipulating the control switches 48 and 50. The icon 79 indicates that the cruise control subsystem is activated and ready to be adjusted. There are two adjustable functions associated with the cruise control subsystem that is illustrated. Accordingly, the adjustment switch 40 and the control switches 148 and 50 do not have any functions associated with them. The adjustment switch 42 and the control switches 44 and 46 do not have any effect on the cruise control subsystem and, therefore, appear as illustrated on the display 74.

Figure 4:
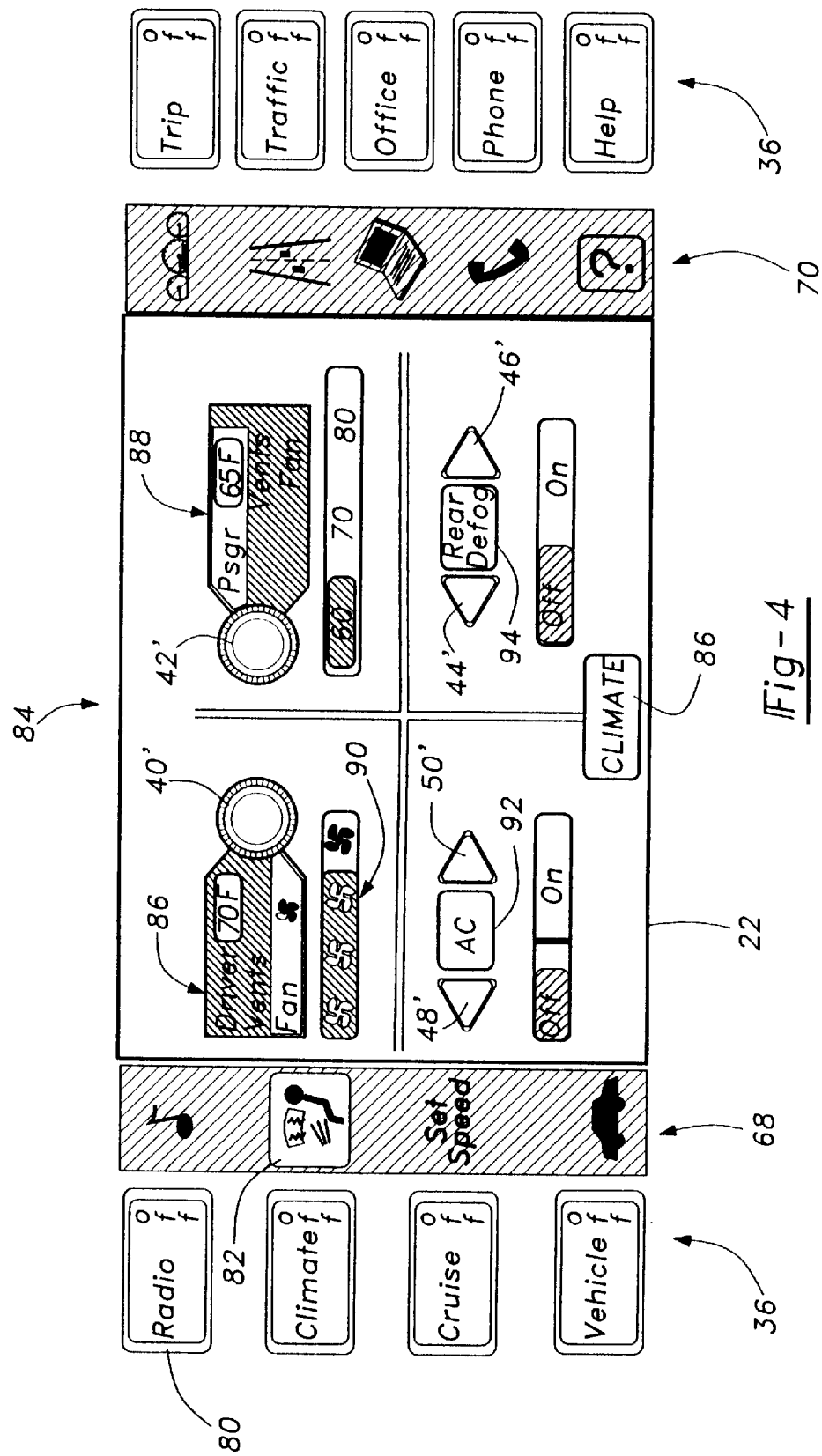
FIG. 4 is a diagrammatic illustration of a screen display associated with this invention.

Referring to FIG. 4, when a driver presses the activation surface of the selection switch 80, the heating, ventilation and air conditioning subsystem (HVAC) icon 82 is highlighted and the display appears on the screen 22. In the illustrated embodiment, a plurality of functions 86 for controlling the climate on the driver side of the vehicle are adjustable using the multi-purpose adjustment switch 40. A plurality of functions 88 for controlling the climate on the passenger side of the vehicle are adjustable by manipulating the adjustment switch 42. The display 90 indicates the current level of operation of the fan on the driver side of the vehicle. To increase or decrease the fan speed, the driver simply rotates the adjustment switch 40. If the driver wishes to change the temperature, she simply presses the adjustment switch 40 until the temperature function is highlighted and then rotates the adjustment switch 40 to adjust the temperature in a desired direction. The air conditioning function 92 is dedicated to the control switches 48 and 50. Although the control switches 48 and 50 may be used for increasing and decreasing adjustments of a function, in the illustrated embodiment they are used as on and off switches for subsystems such as the air conditioning. Similarly, the control switches 44 and 46 control whether the rear defogger is on or off.

The adjustment switches 40 and 42 are used to adjust and/or select a plurality of functions associated with different subsystems. For example, manipulating adjustment switch 40 adjusts the volume, balance or fade functions of the radio and the temperature, vent door positions and fan speed of the HVAC subsystem on the driver's side of the vehicle. The adjustment switches, therefore, are very useful in realizing a graphical user interface system designed according to this invention.

Similarly, the control switches 44, 46, 48 and 50 are dedicated to one function for each subsystem. The inventive arrangement of the switches, therefore, provides system versatility with a relatively small number of control switches knobs and/or buttons.

A variety of display screens are available, however, the most visually satisfying displays with a large amount of versatility are achieved by using an electroluminescent display. Therefore, an electroluminescent display is preferred. A variety of microprocessors and microcontrollers are commercially available that will suffice for the electronic controller 24.

Figure 5:
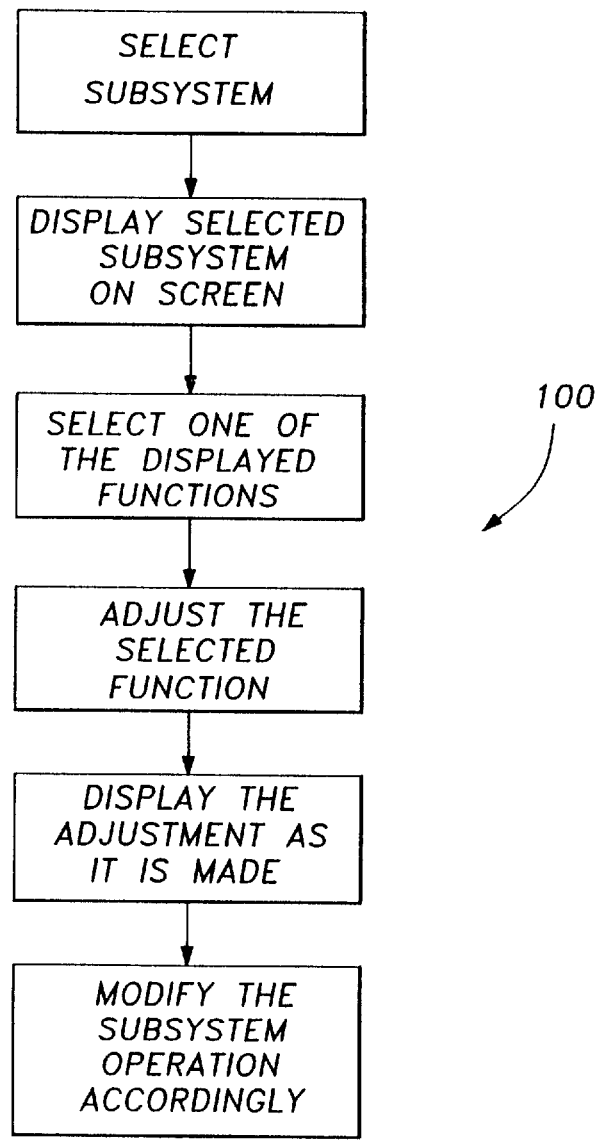
FIG. 5 is a flow chart diagram illustrating a method associated with this invention.

The method of establishing the results discussed above is summarized in flow-chart form in FIG. 5. The flow chart 100 illustrates the basic methodology of this invention in six basic steps. Specifically, a particular subsystem is selected by a user by pressing an activation surface of one of the selection switches 36. The electronic controller 24 then displays the selected subsystem on the screen along with the entire plurality of adjustable functions associated with that subsystem. The user then utilizes the switches 38 to select one of the displayed functions. An appropriate switch is then used to adjust the selected function. The electronic controller 24 ensures that the adjustment made to the selected function is simultaneously displayed on the display screen 22. Electronic controller 24 then modifies the operation of the subsystem according to the adjustment made by the user so that the operation of the subsystem is consistent with that shown on the display screen 22. Given the above description, one skilled in the art can develop the specific code to program the controller 24 to accomplish the results achieved by a system designed according to this invention.

Figure 6:
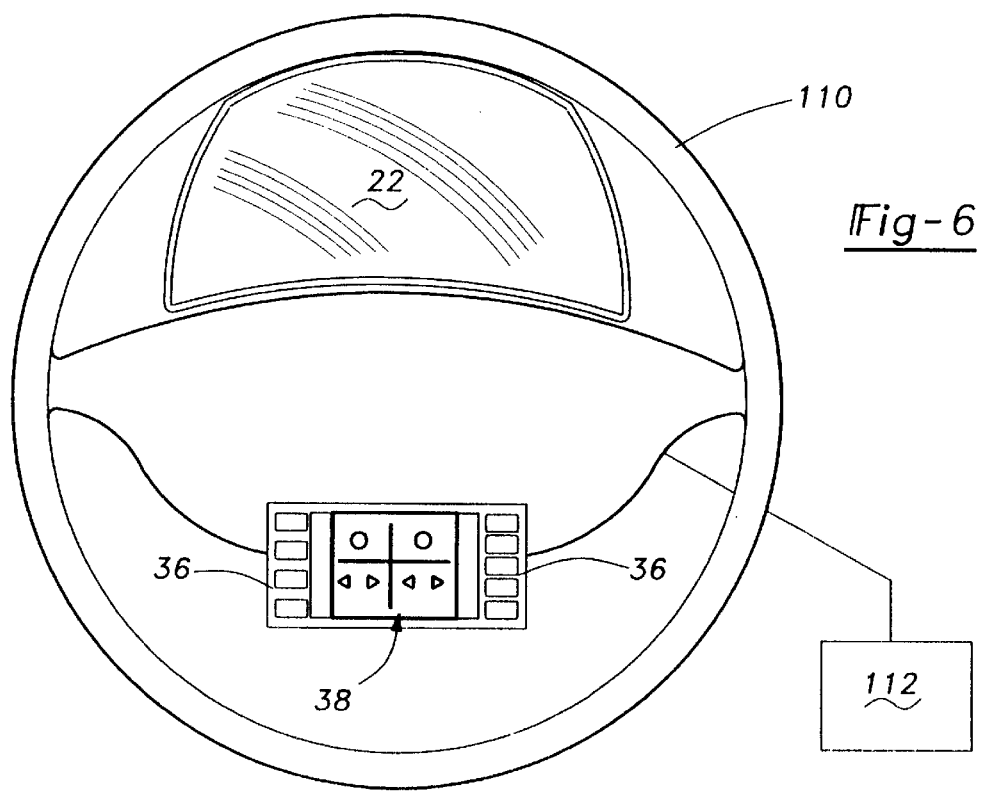
FIG. 6 is a diagrammatic illustration of an alternative embodiment of this invention.

Referring to FIG. 6, the display screen 22, in one embodiment, is mounted on a steering wheel 110 within the vehicle. In that embodiment, the display screen 22 will rotate with the wheel 110 when the steering wheel is rotated by a driver. A wheel position sensor 112 preferably is included for determining a rotated position of the wheel. Information from the sensor 112 is processed by the electronic controller 24 and the display on the display screen 22 preferably is manipulated. Specifically, the display on the display screen 22 will be counter-rotated with rotations of the steering wheel 110 to maintain the display in an upright, readable orientation relative to the driver. In the preferred embodiment, the wheel position sensor 112 determines an angle of rotation of the steering wheel 110 from a home position (illustrated in FIG. 6). The electronic controller 24 responsively rotates the display on the display screen 22 through an angle in an opposite direction and having a magnitude proportional to the angle of rotation of the steering wheel 110.

The above description is exemplary rather than limiting in nature. For example, a variety of arrangements of selection switches and control switches could be implemented. Similarly, the arrangement of the display on the display screen can be varied from the illustrations discussed above. Those skilled in the art will realize that variations and modifications of the disclosed embodiment will not necessarily depart from the purview and spirit of this invention. Accordingly, the legal scope accorded to this invention can only be determined by studying the appended claims.

What is claimed is:

1. A system for controlling a plurality of subsystems within a vehicle, comprising:

a plurality of selection buttons that are manipulable to select one of the plurality of subsystems to be controlled;

a display screen adapted to display the selected subsystem and a plurality of adjustable functions associated with the selected subsystem;

a multi-purpose switch that is manipulable in a first mode to select from among said displayed plurality of adjustable functions and manipulable in a second mode to make adjustments to the selected subsystem function; and an electronic controller coupled with the plurality of subsystems, said selection switches, said display screen and said adjustment switch, said controller controlling said display screen for displaying the selected subsystem and adjustments made to said adjustable functions as adjustments are made by a user manipulating said adjustment, said controller causing an operation of the subsystems to be changed responsive to said adjustment switch being manipulated so that the operation of each subsystem is consistent with a display of each subsystem.

2. The system of claim 1, wherein each of the plurality of selection selection switches is dedicated to one of the subsystems and each subsystem has a unique display that is displayed on said screen upon said selection switch dedicated to that subsystem being manipulated.

3. The system of claim 1, further comprising a control switch that is manipulable to adjust a particular one of said displayed plurality of adjustable functions and wherein said adjustment switch and control switch are spatially arranged in a preselected order and said controller controls said display screen to display representations of said adjustment switch and control switch in said preselected order and wherein said particular function is displayed with said representation of said control switch and a remainder of said plurality of functions are displayed with said representation of said adjustment switch.

4. The system of claim 3, wherein said controller controls said screen display to display changes in said plurality of functions that correspond to a manipulation of said adjustment switch or control switch simultaneous with said manipulation.

5. The system of claim 1, further comprising two adjustment switches and four control switches, said four control switches being divided into two sets of two switches, respectively and wherein each said set of control switches is associated with a particular one of said adjustable functions, respectively.

6. The system of claim 1, wherein the vehicle includes a steering wheel and said display screen is mounted on the steering wheel.

7. The system of claim 6, wherein the steering wheel is rotatably supported within the vehicle and further comprising a position sensor coupled to said steering wheel for sensing a rotated position of the steering wheel, said position sensor being coupled to said electronic controller and wherein said controller controls said display screen so that the display on said screen rotates responsive to rotation of the steering wheel to maintain a desired orientation of the display on said screen regardless of the rotated position of the steering wheel.

8. The system of claim 1, wherein said plurality of selection switches are each dedicated to one of the vehicle subsystems and wherein said selection switches have a first surface and a second surface that is smaller in dimension than said first surface, said first surface including a visual indication of the dedicated subsystem, said controller controlling said display screen to display a dedicated subsystem upon a user manipulating one of said selection switch first surfaces, said controller terminating the display of the dedicated subsystem upon a user manipulating the selection switch second surface.

9. The system of claim 8, wherein said controller controls said display screen to display visual representations of the plurality of subsystems whenever said system is activated and wherein a representation corresponding to a selected subsystem is distinctively displayed relative to the nonselected subsystems.

10. The system of claim 9, wherein said selection switches are positioned adjacent said display screen and said visual representations are displayed on said screen adjacent said selection switches.

11. The system of claim 1, wherein said first mode includes pressing said multi-purpose adjustment switch and wherein said second mode includes rotating said multi-purpose adjustment switch.

12. A method of controlling a plurality of subsystems within a vehicle that includes a display screen, a plurality of selection switches each dedicated to a respective subsystem, at least one multi-purpose adjustment switch for controlling a plurality of functions associated with the subsystems and an electronic controller for controlling the display screen and the subsystems, comprising the steps of:

(A) manipulating a selected one of the selection switches to select the subsystem associated with the selected selection switch;

(B) displaying the selected subsystem and a plurality of functions associated with the selected subsystem on the display screen, using the electronic controller, in response to step (A) being performed;

(C) manipulating the multi-purpose adjustment switch in a first mode to select one of the displayed associated functions;

(D) manipulating the multi-purpose adjustment switch in a second mode to adjust the selected function;

(E) simultaneously displaying an adjustment made to the selected function on the display screen, using the electronic controller, responsive to step (D) being performed; and (F) adjusting the selected subsystem, using the electronic controller, responsive to step (D) being performed.

13. The method of claim 12, further comprising repeating steps (C) through (F) for a plurality of functions associated with the selected subsystem.

14. The method of claim 12, wherein the vehicle includes a rotatable steering wheel and the display screen is supported on the steering wheel and the method further comprises the steps of:

determining a desired orientation of a display on the display screen with respect to a driver of the vehicle;

determining a steering wheel home position wherein the display screen is aligned with the desired display orientation;

determining a rotated position of the steering wheel with respect to the steering wheel home position; and rotating the display on the display screen an amount corresponding to the rotated position of the steering wheel to maintain the display in the desired orientation.

15. The method of claim 14, wherein the rotated position of the steering wheel is determined by determining a magnitude and direction of a steering wheel angle of rotation from the steering wheel home position to the rotated position and wherein the display is rotated in an opposite direction about a display angle of rotation that has a magnitude that is proportional to the steering wheel angle of rotation.

16. The method of claim 12, further comprising the steps of displaying a visual representation of each of the subsystems on the display screen whenever the display screen is activated and visually distinguishing a visual representation of a selected subsystem from a remainder of the displayed visual representations responsive to step (A) being performed.

17. The method of claim 12, wherein step (B) includes displaying a representation of the multi-purpose adjustment switch along with the plurality of functions associated with the selected subsystem on the display screen.

18. A system for controlling a plurality of subsystems within a vehicle, comprising:

a plurality of selection switches that are manipulable to select one of the plurality of subsystems to be controlled;

a display screen adapted to display the selected subsystem and a plurality of adjustable functions associated with the selected subsystem;

a multi-purpose adjustment switch that is manipulable to select from among said displayed plurality of adjustable functions and manipulable to make adjustments to a selected subsystem function;

an electronic controller coupled with said plurality of subsystems; said selection switches, said display screen and said adjustment switch, said controller controlling said display screen for displaying the selected subsystem and adjustments made to said adjustable functions as adjustments are made by a user manipulating said adjustment switch, said controller causing an operation of the subsystems to be changed responsive to said adjustment switch being manipulated so that the operation of each subsystem is consistent with a display of each subsystem; and a control switch that is manipulable to adjust a particular one of said displayed plurality of adjustable functions and wherein said adjustment switch and control switch are spatially arranged in a preselected order and said controller controls said display screen to display representations of said adjustment switch and control switch in said preselected order and wherein said particular function is displayed with said representation of said control switch and a remainder of said plurality of functions are displayed with said representation of said adjustment switch.

19. The system of claim 18, wherein said controller controls said screen display to display changes in said plurality of functions that correspond to a manipulation of said adjustment switch or control switch simultaneous with said manipulation.

\* \* \* \* \*